(12) United States Patent
Roberts et al.

(10) Patent No.: US 7,960,922 B2
(45) Date of Patent: Jun. 14, 2011

(54) HIGH EFFICIENCY LOW POWER CAPACITOR CHARGED DC DRIVER

(75) Inventors: Bruce Richard Roberts, Mentor-on-the-Lake, OH (US); Louis Robert Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 63 days.

(21) Appl. No.: 12/603,340

(22) Filed: Oct. 21, 2009

(65) Prior Publication Data

US 2011/0089867 A1    Apr. 21, 2011

(51) Int. Cl.
*H05B 37/00* (2006.01)
(52) U.S. Cl. .................. 315/307; 315/209 R; 315/227 R
(58) Field of Classification Search .................. 315/307, 315/308, 209 R, 223, 224, 225, 227 R, 240, 315/241 R, DIG. 4, 291, 310, 311, 246, 247
See application file for complete search history.

(56) References Cited

U.S. PATENT DOCUMENTS

| | | | |
|---|---|---|---|
| 3,705,316 A | 12/1972 | Burrous et al. | |
| 5,406,471 A | 4/1995 | Yamanaka | |
| 5,959,410 A | 9/1999 | Yamauchi et al. | |
| 6,266,256 B1 | 7/2001 | Lehnert et al. | |
| 6,510,062 B2 | 1/2003 | Goder et al. | |
| 6,791,848 B2 | 9/2004 | Porter et al. | |
| 6,961,251 B2 | 11/2005 | Porter et al. | |
| 7,091,672 B2 * | 8/2006 | Steffie et al. | 315/282 |
| 7,135,934 B2 | 11/2006 | Sanchez et al. | |
| 7,271,545 B2 | 9/2007 | Hu et al. | |
| 7,279,958 B1 | 10/2007 | Mullin et al. | |
| 7,291,983 B2 | 11/2007 | Hu et al. | |
| 7,391,630 B2 | 6/2008 | Acatrinei | |
| 7,449,841 B2 | 11/2008 | Ball | |
| 7,791,326 B2 * | 9/2010 | Dahlman et al. | 323/284 |
| 2005/0052220 A1 | 3/2005 | Burgener et al. | |
| 2006/0197608 A1 | 9/2006 | Sanchez et al. | |
| 2007/0159116 A1 | 7/2007 | Hu et al. | |
| 2007/0247006 A1 | 10/2007 | Ball | |
| 2008/0116818 A1 * | 5/2008 | Shteynberg et al. | 315/192 |
| 2008/0122385 A1 | 5/2008 | Dou et al. | |
| 2008/0191784 A1 | 8/2008 | Khoury et al. | |

FOREIGN PATENT DOCUMENTS

EP    2063523 A2    5/2009

OTHER PUBLICATIONS

WO Search Report issued in connection with corresponding WO Patent U.S. Appl. No. 10/045,017, filed Aug. 10, 2010.

* cited by examiner

*Primary Examiner* — David Hung Vu
(74) *Attorney, Agent, or Firm* — Fay Sharpe LLP

(57) ABSTRACT

A high efficiency low power DC driver apparatus is presented for powering a light source, with a capacitive divider circuit receiving an AC input and providing a divided AC output, a rectifier provide a DC output below ten watts, output terminals coupleable to one or more light sources, and a linear regulator coupled in series with the light source to regulate a drive current flowing through the series circuit.

16 Claims, 5 Drawing Sheets

HIGH EFFICIENCY LOW POWER CAPACITOR CHARGED DC DRIVER

BACKGROUND OF THE DISCLOSURE

This disclosure relates to low power DC lighting devices and DC driver apparatus. Low power DC lighting devices are becoming more and more popular. For example, light emitting diodes (LEDs) and organic LEDs (OLEDs) are gaining popularity in applications where single-digit wattage light output is desired. Driver circuits for powering such light sources from AC power supplies have thus far typically included multiple power conversion stages and have failed to provide good power efficiency. Attempts to improve efficiency by capacitor charging and a controlled half wave rectification have proven difficult to control. As a result, there is a need for improved low cost, low power, high efficiency drivers for converting AC input power to DC power as low power DC-driven lighting devices continue to proliferate.

SUMMARY OF THE DISCLOSURE

A high efficiency low power DC driver apparatus is provided for powering a light source. The driver apparatus has input terminals for connection to an AC power supply and a capacitive divider circuit with first and second capacitances coupled in series between the input terminals to provide a reduced or divided AC output at an intermediate node. A rectifier receives and rectifies the divided AC output to provide a DC output at a power level of less than 10 watts, and one or more light sources are coupled with the DC output via a driver output terminal. The driver includes a linear regulator coupled with the light source(s) to form a series circuit between the DC output nodes of the rectifier, where the linear regulator regulates a drive current flowing through the series circuit.

In some embodiments, the linear regulator includes a field-effect transistor, such as a MOSFET with drain and source terminals coupled in the series circuit and a gate terminal to control the drive current, along with a sense resistance coupled in the series circuit and an op amp circuit with an input coupled to sense a voltage across the sense resistance and an output controlling the FET gate voltage to regulate the drive current flowing through the series circuit.

In other embodiments, the linear regulator includes a three-terminal voltage regulator device with an input terminal coupled with one of the DC output nodes, an output terminal coupled with one of the driver output terminals, and an adjustment terminal. A first resistance is coupled between the output terminal and the adjustment terminal and a second resistance is coupled between the adjustment terminal and the other one of the driver output terminals, with the three-terminal regulator regulating the voltage between the driver output terminals in order to regulate the drive current provided to the light source(s).

The linear regulator in some embodiments is adjustable for dimming the lighting device, and/or may provide soft starting by controlling the drive current rise time. The ratio of the capacitances of the capacitive divider in some embodiments is set such that the linear regulator regulates only during startup and/or for dimmed operation of the lighting device in order to facilitate high efficiency operation. In some embodiments, moreover, the linear regulator is a non-switching regulator to avoid excessive EMI or RFI emissions without requiring additional components.

BRIEF DESCRIPTION OF THE DRAWINGS

One or more exemplary embodiments are set forth in the following detailed description and the drawings, in which.

DETAILED DESCRIPTION OF THE PREFERRED EMBODIMENTS

Figure 1:
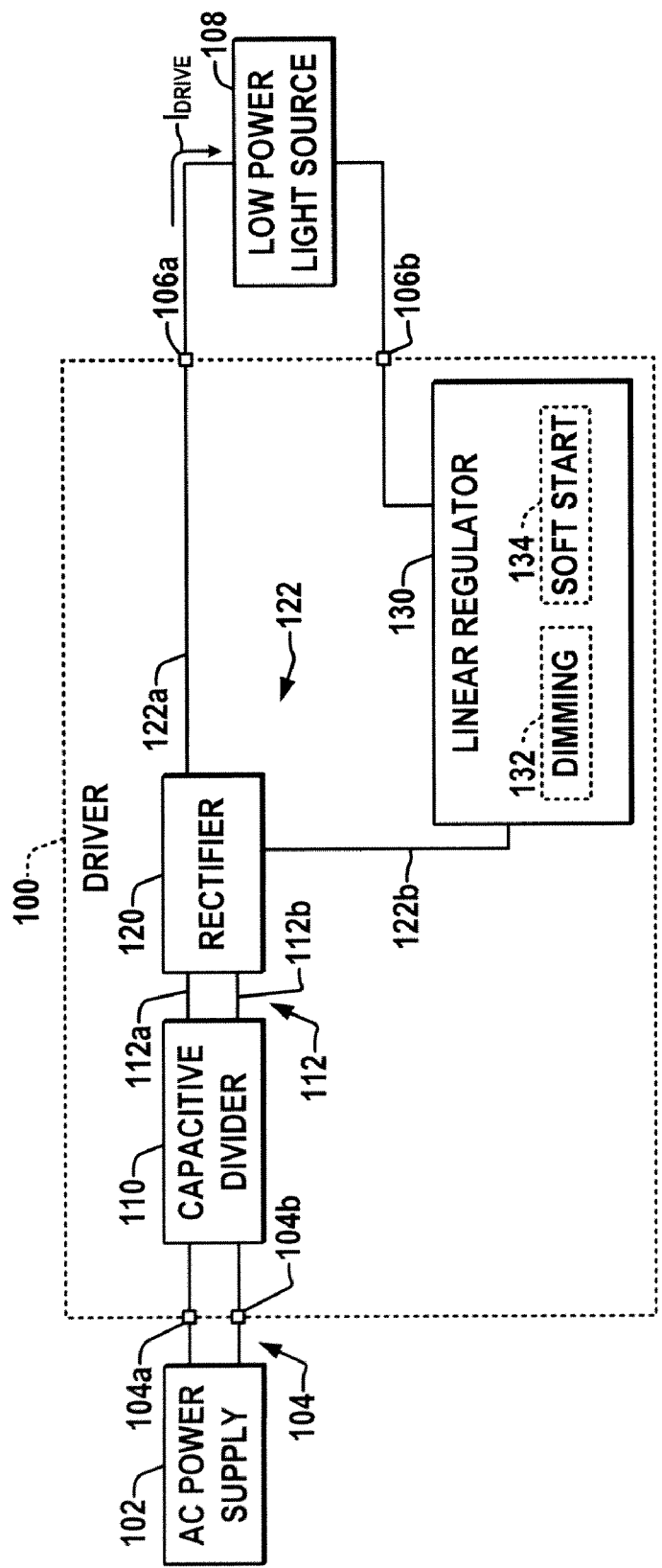
FIG. 1 is a schematic diagram illustrating an exemplary low power high efficiency DC light source driver with a capacitive divider, a rectifier and a linear regulator forming a series circuit with a driven light source.
Figure 2:
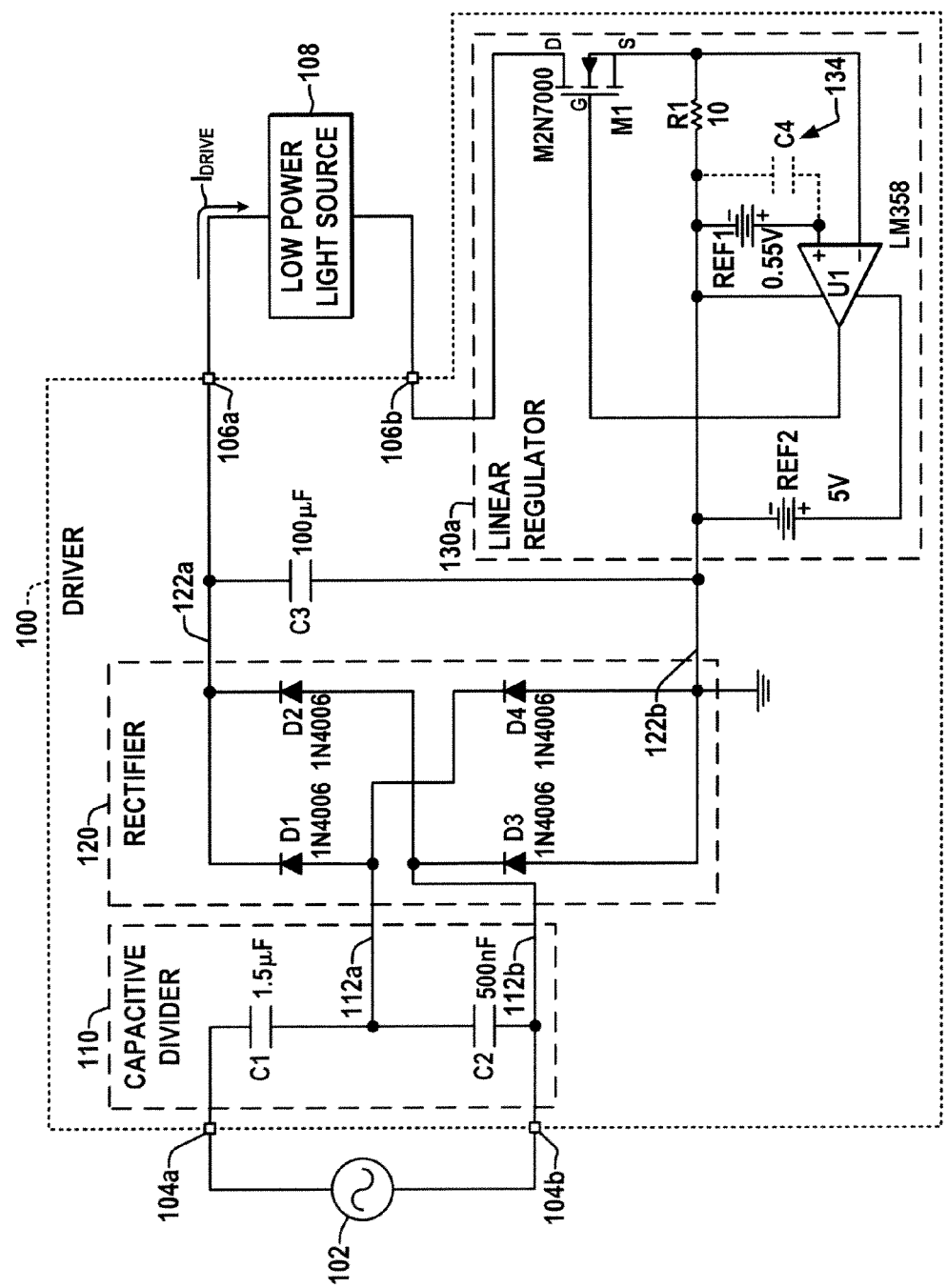
FIG. 2 is a schematic diagram illustrating a driver embodiment in which the linear regulator includes an op amp circuit and an n-channel MOSFET regulating the light source drive current with optional dimming and soft starting circuitry.
Figure 3:
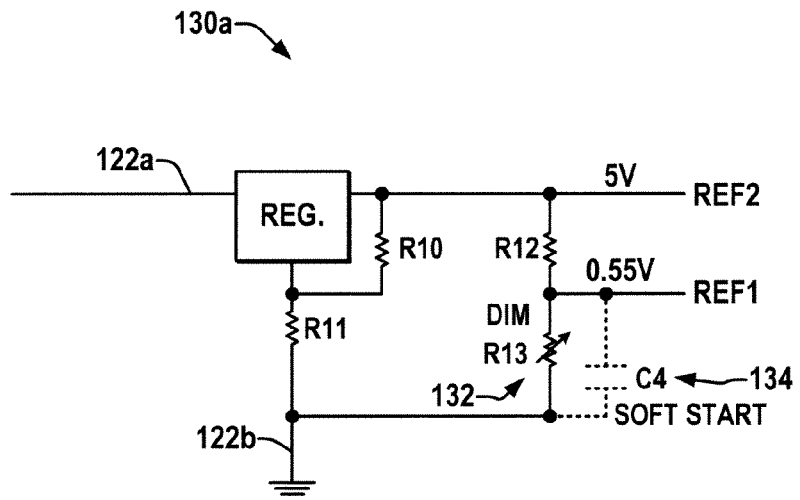
FIG. 3 is a partial schematic diagram illustrating an implementation of the op amp circuit references in the regulator of FIG. 2.

Referring now to the drawings, where like reference numerals are used to refer to like elements throughout, and where the various features are not necessarily drawn to scale, FIGS. 1-3 illustrate embodiments of a high efficiency, low power AC line voltage to DC driver apparatus 100 for powering one or more lighting devices 108, such as LEDs, OLEDS, etc. The driver 100 includes an input 104 with first and second input terminals 104a and 104b coupleable to a single or multi-phase AC power supply 102, such as a standard single-phase 120 VAC (RMS) power connection in the illustrated example (further input terminals, not shown, may be provided for multi-phase input connections). The input 104 is connected to a capacitive divider circuit 110 with first and second capacitances C1 and C2 (FIG. 2) coupled in a series branch between the terminals 104a and 104b to form a capacitive divider providing a reduced (divided) AC output at an intermediate node 112a. The first divider capacitance C1 operates as a charge pump capacitor with an Xc limiting the current into a rectifying full bridge diode network 120. C2 serves to smooth out the input current signal and also provides a capacitor divider network to lower input surge voltage spikes during transients without requiring additional transient suppression circuitry. In certain embodiments the ratio of the C1/C2 is greater than 2, such as a ratio of three in the embodiment of FIG. 2.

The capacitive divider 110 provides the reduced AC output to a rectifier 120 which rectifies the divided AC output to provide a DC output 122 at a pair of DC output nodes 122a and 122b at a power level of less than 10 watts. The illustrated rectifier 120 is a full wave passive rectifier including diodes D1-D4, but other AC-DC circuitry may be used, such as half wave passive rectifiers, active rectifiers, etc. C3 (FIG. 2) is an optional DC smoothing capacitor coupled across the rectifier output 122. The driver 100 provides an output 106 with driver output terminals 106a and 106b coupleable to one or more light sources 108, such as single or multiple (series and/or parallel connected) LEDS, OLEDS, etc. A first driver output terminal 106a in the embodiments of FIGS. 1 and 2 is coupled with the first DC output nodes 122a of the rectifier 120, and the other driver output terminals 106b is coupled to a linear regulator 130.

Figure 7:
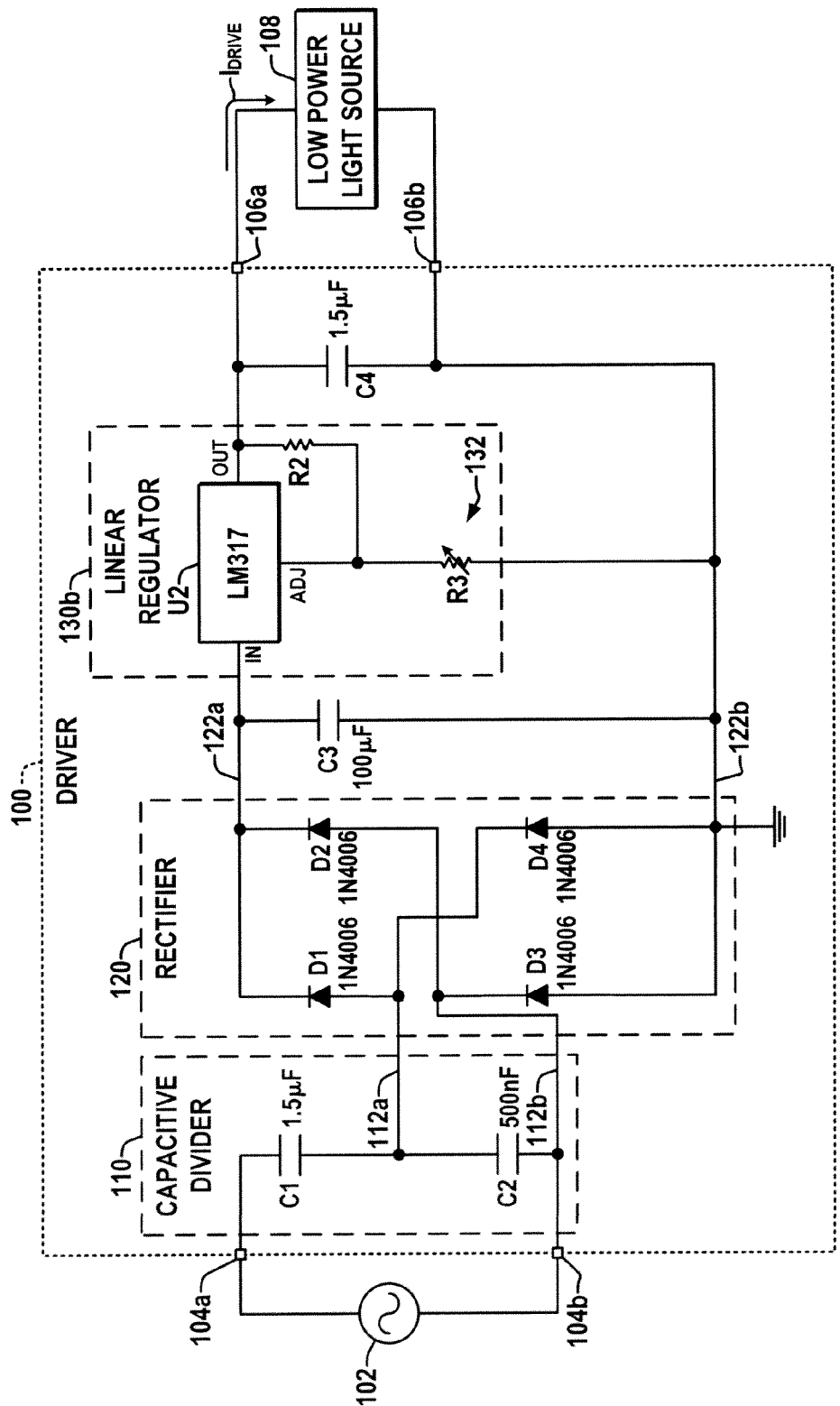
FIG. 7 is a schematic diagram illustrating another driver embodiment with the linear regulator including a three terminal voltage regulator with optional dimming control.

In the embodiment of FIG. 2, the regulator 130a is coupled in a series circuit between the light source(s) 108 and the second rectifier DC output node 122b, where the regulator 130 is operative to regulate a drive current $I_{DRIVE}$ flowing through the series circuit. In this manner, a controlled light output is provided by the source(s) 108. Other embodiments may include a regulator coupled in the upper circuit branch between the first rectifier output terminal 122a and the light source(s) 108, for example, as shown in the embodiment of FIG. 7. As shown in FIG. 1, moreover, the regulator 130 may include dimming circuitry 132 for dimming the lighting device 108 and/or soft starting circuitry 134 to control the rise time of the drive current $I_{DRIVE}$ flowing through the series circuit, for example, to protect OLED type light sources 108 from current spikes at startup.

In the embodiment of FIG. 2, the linear regulator 130a includes an n-channel enhancement mode MOSFET M1 with a drain terminal D and a source terminal S coupled in the series circuit. The transistor M1 has a control gate terminal G operative to control the amount of current flowing between the drain and source terminals D and S ($I_{DRIVE}$). A sense resistance R1 is coupled in the series circuit between M1 and the second DC output node 122b (circuit ground in this example), and the voltage across R1 is representative of the drive current $I_{DRIVE}$ provided to the light source(s) 108. The regulator 130a in this embodiment also provides an op amp circuit including an op amp U1 and two reference voltage devices or circuits REF1 and REF2. The inverting op amp input of U1 is coupled with the sense resistance R1 to sense the voltage across R1, and the non-inverting input is coupled to REF1 (e.g., 0.55 VDC in this example), with the op amp U1 being powered by REF2 (e.g., 5 VDC).

The op amp U1 provides an output controlling the voltage applied to the gate terminal G of the field-effect transistor M1 and operates to regulate the drive current $I_{DRIVE}$ flowing through the series circuit, thereby regulating the illumination level provided by the source(s) 108. Moreover, provision of an adjustable reference REF1 can function to adjust the regulated drive current $I_{DRIVE}$ for dimming applications. In addition, the regulator 130a can implement soft starting functionality, such as by including a capacitance C4 in the op amp circuit to control the rise time of the drive current $I_{DRIVE}$.

The reference voltages REF1 and REF2 can be derived from the rectifier output by any suitable circuitry, an example of which is shown in FIG. 3. In this example, a regulator device U10 receives the positive rectifier output at terminal 122a and provides a 5VDC regulated output for REF2 via resistors R10 and R11, with a resistive voltage divider circuit R12, R13 setting the voltage level of REF1. For dimming implementations, R13 may be variable (e.g., potentiometer), and soft starting may be implemented by coupling capacitance C4 between REF1 and the circuit ground at terminal 122b. In this regard, the inventors have appreciated that OLEDs and other types of light sources 108 may be particularly sensitive to current surges at start up or thereafter, and provision of soft starting circuitry 134 facilitates a generally constant dv/dt form of operation during transitions and/or transients to mitigate device degradation extend operational life of the light source(s) 108.

The example embodiments of FIGS. 2 and 3 are designed for driving a 50 mA nominal drive current $I_{DRIVE}$ for an OLED light source 108 at approximately 24VDC for nominal 100% light output, with the possibility of dimming to reduce the output power. The exemplary implementation is thus a low power driver 100 (e.g., around 1.2 watts), where the rectifier output bus voltage level is set by the ratio of the divider capacitances of the C1/C2 of the circuit 110. Specific embodiments set this ratio to be above 2, where the example of FIG. 2 has a ratio of 3. Other embodiments are contemplated providing output power levels of single-digit wattage, such as less than 10 watts, where other currents and voltages levels can be designed based on the selection of charge pump capacitance. Moreover, the drivers 100 can be employed to power any low output power DC-driven lighting device or devices, and the disclosure is not limited to LED or OLED applications. Efficiencies of 88-92% have been achieved in prototype and simulation of the driver 100 for nominal operation and efficiencies in practice are expected to be well above those of conventional two-stage commercial supplies (typical efficiencies of about 72% or less). The embodiment of FIGS. 2 and 3, moreover, provides a design with small size, low cost and low component count while implementing high efficiency, and without use of switching components (i.e., the linear regulator 130a is a non-switching regulator with FET M1 operating generally in linear mode), whereby EFI/RFI emissions are controlled.

Figure 4:
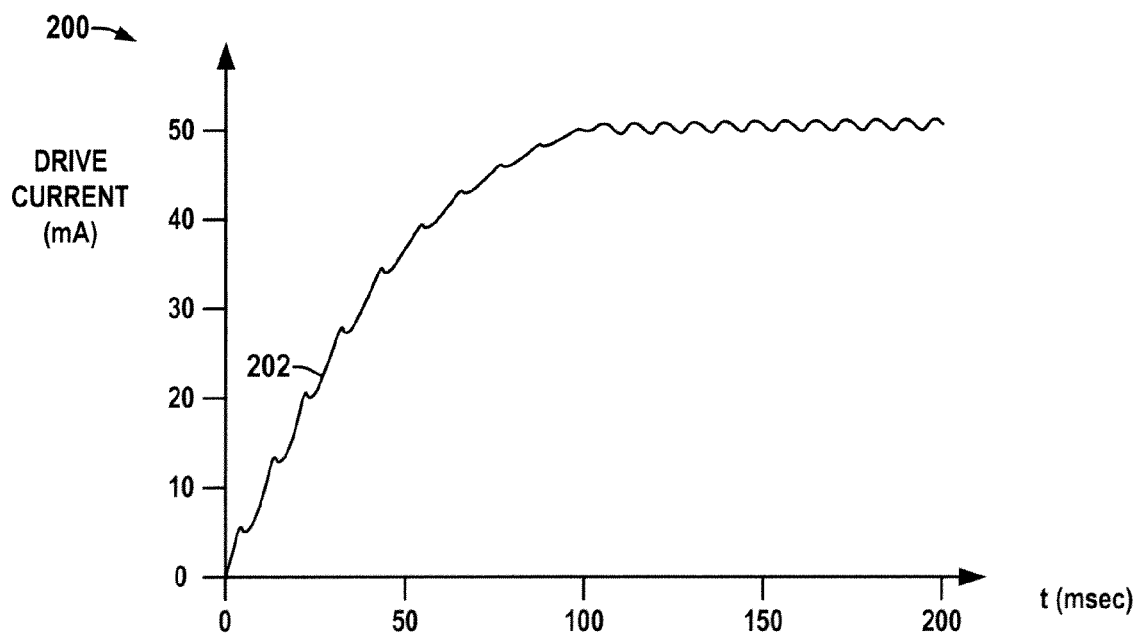
FIG. 4 is a graph illustrating the drive current as a function of time in the driver of FIG. 1 with no soft starting or dimming.
Figure 5:
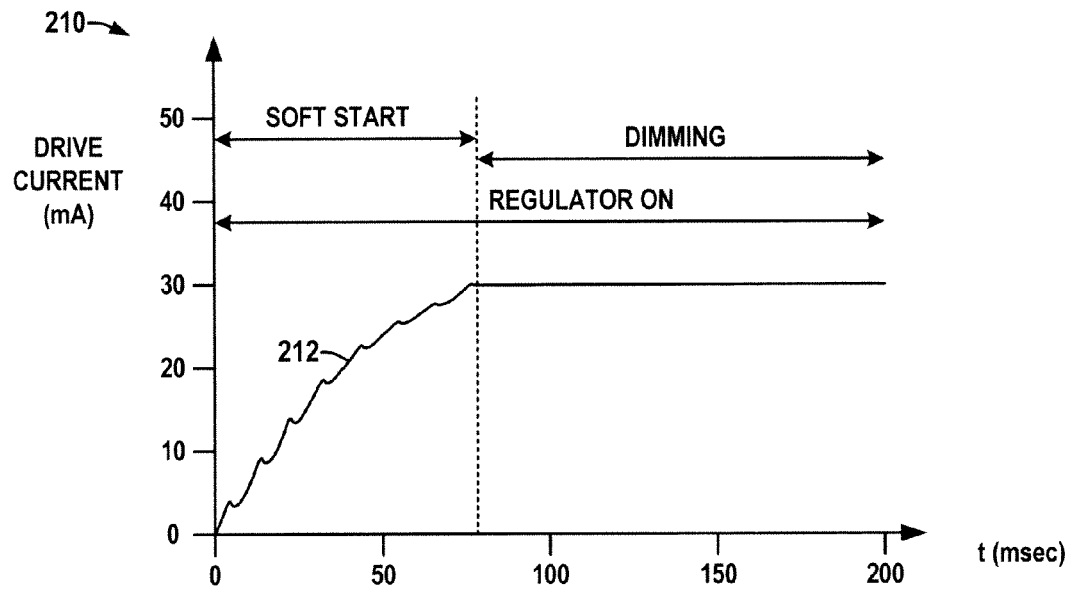
FIG. 5 is a graph illustrating the drive current as a function of time in the driver of FIG. 1 with soft starting and dimming.
Figure 6:
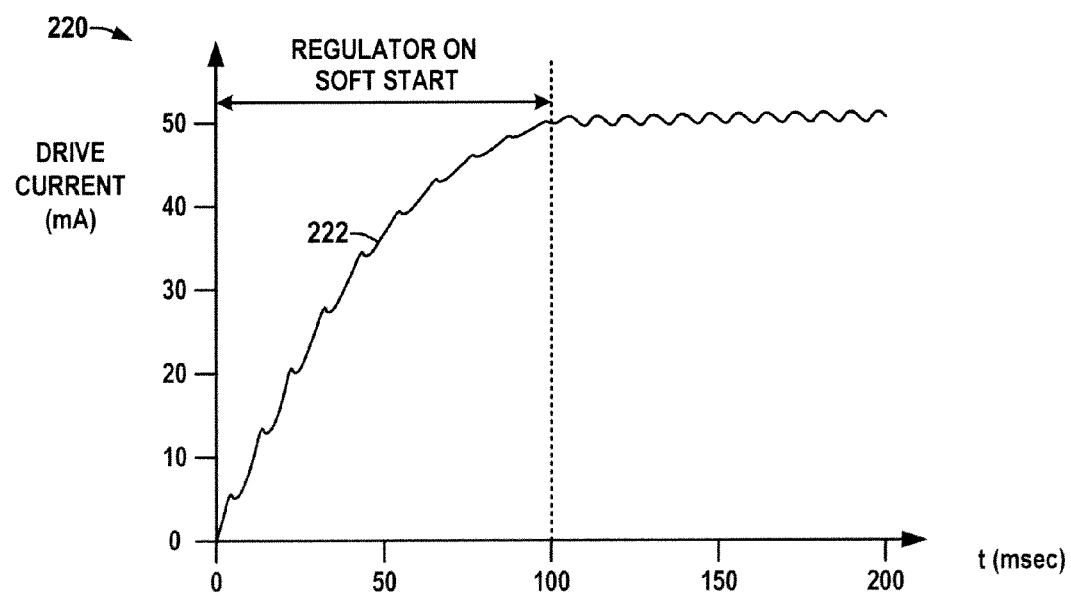
FIG. 6 is a graph illustrating the drive current as a function of time in the driver of FIG. 1 with soft starting.

Referring to FIGS. 4-6, the ratio of the first and second capacitances C1 and C2 of the capacitive divider 110 can be set such that the linear regulator 130 regulates only during startup and/or during dimming operation, whereby power consumption by the regulator circuit 130 can be mitigated in practice. A graph 200 in FIG. 4 shows a curve 202 representing the output drive current $I_{DRIVE}$ during startup for operation of the illustrated embodiment 100 at a nominal drive current $I_{DRIVE}$ of 50 mA, where the capacitive divider circuit 110 and the rectifier 120 provide a DC bus value near the nominal value of 20-24 VDC with no dimming enabled and no soft starting circuitry 134. As seen in this graph 200, the current 202 rises with some amount of 120 Hz ripple (from passive full wave rectification of a 60 Hz input from source 102), and the ripple continues once the steady-state current level has been reached, whereby the regulator circuit 130 need not engage in normal operation at this level, thereby mitigating unnecessary power loss (and efficiency degradation) in the regulator 130 itself. FIG. 5 shows a graph 210 illustrating the drive current 212 as a function of time in the driver 100 with a dimming control 132 (e.g., resistor R13 in FIG. 3) set for 30 mA operation of the light source 108, and with soft starting circuitry 134 included (e.g., capacitance C4). In this case, the regulator 130 operates at startup to slow the current rise time, and continues thereafter to regulate the output current $I_{DRIVE}$ at 30 mA (the dimmed level), at the possible expense of some efficiency loss in the regulator 130 (while eliminating or attenuating the steady-state ripple). However, it is noted that conventional dimming drivers also suffer from reduced efficiencies during dimming operation. In FIG. 6, a graph 220 illustrates the drive current 222 in the driver 100 with soft starting circuit 134 slowing the current rise for a non-dimming application (or with the dimming circuitry set to 100%), where the regulator 130 operates only during startup, after which higher efficiency operation is achieved.

FIG. 7 illustrates another driver embodiment 100 with another non-switching linear regulator 130b, which includes a three terminal voltage regulator U2 (e.g., LM317 in one implementation) with optional dimming control via an adjustable resistance R3 and optional soft starting capacitance C4 at the driver output 106. The three-terminal regulator U2 has an input terminal IN coupled with the DC output node 122a, an output terminal OUT coupled with the driver output terminal 106a, and an adjustment terminal ADJ providing an adjustment current through R3, and a resistance R2 is coupled between the output and adjustment terminals. The three-terminal regulator U2 regulates a voltage between the driver output terminals 106a and 106b to regulate the drive current $I_{DRIVE}$ flowing through the series circuit.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising". The invention has been described with reference to the preferred embodiments. Obviously, modifications and alterations will occur to others upon reading and understanding the preceding detailed description. It is intended that the invention be construed as including all such modifications and alterations.

The following is claimed:

1. A high efficiency low power DC driver apparatus for powering a light source, comprising:
    an input including first and second input terminals coupleable to an AC power supply;
    a capacitive divider circuit including first and second capacitances coupled in series between the input terminals and coupled with one another at an intermediate node, the capacitive divider circuit receiving an AC input at the input terminals and providing a divided AC output at the intermediate node;
    a rectifier operatively coupled with the intermediate node to receive and rectify the divided AC output to provide a DC output at a pair of DC output nodes at a power level of less than 10 watts;
    an output including a pair of driver output terminals coupleable to at least one light source, a first one of the driver output terminals being coupled with a first one of the DC output nodes; and
    a linear regulator coupled between a second one of the driver output terminals and a second one of the DC output nodes to couple the light source and the linear regulator in a series circuit between the DC output nodes, the linear regulator being operative to regulate a drive current flowing through the series circuit.

2. The driver apparatus of claim 1, where the linear regulator comprises:
    a field-effect transistor with drain and source terminals coupled in the series circuit and a gate terminal operative to control the current flowing between the drain and source terminals;
    a sense resistance coupled in the series circuit; and
    an op amp circuit with an input coupled with the sense resistance to sense a voltage across the sense resistance and an output controlling a voltage applied to the gate terminal of the field-effect transistor to regulate the drive current flowing through the series circuit.

3. The driver apparatus of claim 2, where the linear regulator further comprises a capacitance in the op amp circuit to control a rise time of the drive current flowing through the series circuit for soft-starting the driver apparatus.

4. The driver apparatus of claim 2, where a ratio of the first and second capacitances of the capacitive divider is set such that the linear regulator regulates only during startup.

5. The driver apparatus of claim 1, where the linear regulator comprises:
    a three-terminal regulator with an input terminal coupled with one of the DC output nodes, an output terminal coupled with one of the driver output terminals, and an adjustment terminal;
    a first resistance coupled between the output terminal and the adjustment terminal; and
    a second resistance coupled between the adjustment terminal and the other one of the driver output terminals;
    where the three-terminal regulator regulates a voltage between the driver output terminals to regulate the drive current flowing through the series circuit.

6. The driver apparatus of claim 5, where the second resistance of the linear regulator is adjustable for dimming the lighting device.

7. The driver apparatus of claim 5, where a ratio of the first and second capacitances of the capacitive divider is set such that the linear regulator regulates only during startup.

8. The driver apparatus of claim 1, where the linear regulator is operative to control a rise time of the drive current flowing through the series circuit for soft-starting the driver apparatus.

9. The driver apparatus of claim 1, where the linear regulator is adjustable for dimming the lighting device.

10. The driver apparatus of claim 9, where a ratio of the first and second capacitances of the capacitive divider is set such that the linear regulator regulates only during startup and for dimmed operation of the lighting device.

11. The driver apparatus of claim 1, where a ratio of the first and second capacitances of the capacitive divider is set such that the linear regulator regulates only during startup.

12. The driver apparatus of claim 11, where a ratio of the first capacitance divided by the second capacitance of the capacitive divider is greater than 2.

13. The driver apparatus of claim 12, where the ratio of the first capacitance divided by the second capacitance of the capacitive divider is 3.

14. The driver apparatus of claim 1, where a ratio of the first capacitance divided by the second capacitance of the capacitive divider is greater than 2.

15. The driver apparatus of claim 14, where the ratio of the first capacitance divided by the second capacitance of the capacitive divider is 3.

16. The driver apparatus of claim 1, where the linear regulator is a non-switching regulator.

* * * * *